(12) United States Patent
Howard et al.

(10) Patent No.: US 6,778,180 B2
(45) Date of Patent: Aug. 17, 2004

(54) VIDEO IMAGE TRACKING ENGINE

(75) Inventors: Richard T Howard, Huntsville, AL (US); Thomas C. Bryan, Huntsville, AL (US); Michael L. Book, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 171 days.

(21) Appl. No.: 09/967,833

(22) Filed: Sep. 28, 2001

(65) Prior Publication Data

US 2003/0063093 A1 Apr. 3, 2003

(51) Int. Cl.[7] ................................................. G09G 5/00
(52) U.S. Cl. ...................... 345/581; 345/610; 345/443; 345/608; 345/609
(58) Field of Search ................................ 345/581, 610, 345/443, 608, 609

(56) References Cited

U.S. PATENT DOCUMENTS 5,835,640 A * 11/1998 Clements .................... 382/289
5,949,555 A * 9/1999 Sakai et al. ................. 358/462

OTHER PUBLICATIONS

Howard, Richard T., *Video Guidance Sensor Flight Experiment Configuration End Item Specification Part I*, MSFC–SPEC–2614A Feb. 26, 1997.
John Jackson, *Automatic Docking System Sensor Analysis & Mission Performance*, 1998 SPIE Aerosense Conference, 9pages, 1998.
Richard T. Howard, *Video Guidance Sensor Flight Experiment Results* 1998 SPIE Aerosense Conference, 12 pages, 1998.
Richard T. Howard, *The Video Guidance Sensor—A Flight Proven Technology*, 1999 AAS Guidance Navigation and Control Conference, 18 pages, 1999.
John L. Jackson, *Video Guidance Sensor—Optical Performance Prediction and Results from STS–95 Experiment*, SPIE Aerosence Conference 1999, 14 pages, 1999.
Richard T. Howard, *On–Orbit Testing of the Video Guidance Sensor*, SPIE Aerosnce Conference 1999, 12 pages, 1999.
Richard T. Howard, *Video–based Sensor for Tracking 3–Dimensional Targets, Europto Conference*, Sep. 28, 2000, 9 pages.
Richard T. Howard, *The Video Guidance Sensor: Space, Air, Ground, and Sea*, GN&C Conference, Nov. 2, 2000, 14 pages.

* cited by examiner

Primary Examiner—Matthew C. Bella
Assistant Examiner—Tan Tran
(74) Attorney, Agent, or Firm—James J. McGroary; Ross F. Hunt, Jr.

(57) ABSTRACT

A method and system for processing an image including capturing an image and storing the image as image pixel data. Each image pixel datum is stored in a respective memory location having a corresponding address. Threshold pixel data is selected from the image pixel data and linear spot segments are identified from the threshold pixel data selected. The positions of only a first pixel and a last pixel for each linear segment are saved. Movement of one or more objects are tracked by comparing the positions of first and last pixels of a linear segment present in the captured image with respective first and last pixel positions in subsequent captured images. Alternatively, additional data for each linear data segment is saved such as sum of pixels and the weighted sum of pixels (i.e., each threshold pixel value is multiplied by that pixel's x-location).

25 Claims, 3 Drawing Sheets

VIDEO IMAGE TRACKING ENGINE

ORIGIN OF THE INVENTION

This invention was made by employees of the United States Government and may be manufactured and used by or for the Government for governmental purposes without the payment of any royalties.

FIELD OF THE INVENTION

The present invention relates to a system and method for processing an image and, in particular, to a video image tracking engine system and method for capturing and processing image pixel data to rapidly determine image characteristics.

BACKGROUND OF THE INVENTION

Conventional video guidance and tracking systems tend to be heavy, bulky, and slow. One prior art system that suffers from these drawbacks is the Proto-Flight Video Guidance Sensor (Proto-Flight VGS) described in VGS CEI Spec., Part I-MSFC Document #MSFC-SPEC-2614A, 1997. The Proto-Flight VGS weighs 88 pounds, is 1800 cubic inches, consumes 168 watts, and operates at only 5 cycles per second. The Proto-Flight VGS uses a commercial analog CCD camera. Although the Proto-Flight VGS has previously been utilized in experiments on shuttle flights STS-87 and STS-95, due to its size, weight and speed, the Proto-Flight VGS is of limited usefulness in other applications.

Analog video cameras, such as the CCD camera, output image pixel data mixed with timing and display pulses in a composite signal, thus preventing precise separation and digitization of the image pixels. A complex analog video signal sync separator/digitizer/counter-based frame grabber is used to process the composite signal. However, one disadvantage of the complex frame grabber is that it precludes real-time sub-windowing by the camera, that is, capturing and analyzing only a portion of a camera's field of view rather than the camera's complete field of view.

The Proto-Flight VGS software has two different pixel algorithms in five different imaging schemes that are selected based on a range and a sensor mode. Both pixel algorithms require complex software computation with 20 to 50 instructions per pixel. Although complex, the pixel algorithms of the Proto-Flight VGS software are insufficient for edge tracking and moment detection. One additional disadvantage of prior art image/object tracking systems is that the imager (e.g., camera) does not produce (i.e., output) synchronous data. As described above, the camera outputs a composite signal comprised of image pixel data mixed with timing pulses and display pulses. Consequently, image pixel data can not be stored in memory such that a processor can access individual pixel data directly without requiring additional unpacking instruction or memory wait states.

Other prior art image trackers store and process pixel positions of all image pixel data above a threshold. This can slow down the image tracker by requiring storage and processing of more pixel data than is necessary.

SUMMARY OF THE INVENTION

The present invention provides a system and method for processing an image containing a spot representing an object, comprising: capturing an image as an array of image pixel data, wherein said array is comprised of a plurality of columns and rows whereby each image pixel has an associated x-coordinate and y-coordinate; generating a respective memory address for each image pixel datum in said array of image pixel data and maintaining information in association with each said memory address identifying the position within said image of its respective image pixel datum; storing each image pixel datum in its respective memory address; comparing each image pixel datum to a threshold to identify linear spot segments wherein the pixel data from two or more pixels located in adjacent columns in the image exceed said threshold, said linear spot segments representing a portion of said object; and identifying and storing the array coordinates determined from the respective memory addresses for only the first and last pixel of each linear spot segment in said image pixel data. Spots in the image are identified based upon linear spot segments that appear in adjacent rows of the image and characteristics of these spots can be determined from the stored information. Movement characteristics of a spot, such as velocity, can be determined by comparing successive captured images. In a further, alternative embodiment, additional data for each linear data segment is saved such as sum of pixels and the weighted sum of pixels.

In one embodiment, the threshold is described with respect to a particular pixel intensity (viz., a particular voltage) and intensity data from each pixel is compared to the threshold to determine if the pixel intensity is greater than the threshold. This process is called "thresholding" the data. The pixels exceeding the threshold are called threshold pixels. The threshold may be either manually determined or it may be automatically set, for example, by using an automatic gain control (AGC) responsive to prior data captures.

Data describing each image pixel is stored in an associated memory address that corresponds with the location of that particular image pixel in the captured image. Thus, if an object or "spot" appears within the captured image, as the pixel data is thresholded, a linear segment of pixels exceeding the threshold will appear in each row at the position of the spot, thus creating a linear spot segment. Advantageously, the position (e.g., x-coordinates and y-coordinates as determined by memory address) of the first and last pixel in a linear spot segment of the image are identified and stored. As successive rows of the captured image are processed, the identified pixels define a composite two dimensional image spot.

In a further embodiment, the method provides for processing, i.e., thresholding (and subsequently identifying and storing), only certain portions of the captured image. In such an embodiment, although the data describing all the pixels from the captured image may be first stored in their respective memory locations, only those pixels falling within a particular region of interest (ROI) are thresholded. Consequently, only the threshold pixels appearing within that region of interest are identified and stored. This is particularly useful if only the ROI is relevant or if a change is expected in the ROI, such as movement of the subject spot or the appearance of a second spot. If the ROI is sufficiently small as compared to the entire captured image, processing the pixel data only in an ROI can provide greatly improved speed and efficiency, thereby permitting a faster image capture and processing rate.

In a further embodiment, a second image is captured and processed. Movements of a linear spot segment can be tracked based on comparing the respective first and last pixel positions of the linear spot segment present in the first image pixel data with those in the second image pixel data (typically, the comparison is carried out once the composite spots are defined). Further images can be captured and processed to further track the linear spot segment and, predictions regarding spot movement (to dynamically define the ROI) can be made based on the processing of previously captured images.

In addition to thresholding to determine the positions of the spots (or linear spot segments), areas of non-interest can also be removed from the captured image prior to processing. This can be done simply by comparing the captured image to a prior captured image and processing only the changes or, as set forth above, by defining a region of non-interest, thereby removing that region from further processing.

It is advantageous when using the system and method of the invention that the spots to be tracked appear very bright with respect to the background in the captured image, i.e., high contrast. This allows the threshold to be set very high so that only the pixels in the immediate region of the spots need to be processed and stored. Supplementary lighting may be used to enhance the relative brightness of the spots especially, for instance when the objects to be tracked are provided with a reflective or retro-reflective surface. Supplementary lighting may include, for example, laser lighting or another type of auxiliary lighting. Advantageously, in particular situations, the tracked object may be fitted with LEDs (light emitting diodes) or an alternative type of light emitting device. Either type of light source may constantly illuminate or be flashing. It is preferable to control the lighting so that it flashes in sync with the image capture device to thereby control the exposure of the image capture device, thus enhancing image discrimination and control.

Other features and advantages of the present invention will be set forth in, or apparent from, the detailed description of the preferred embodiments which is set forth below.

DESCRIPTION OF THE PREFERRED EMBODIMENTS

Figure 1:
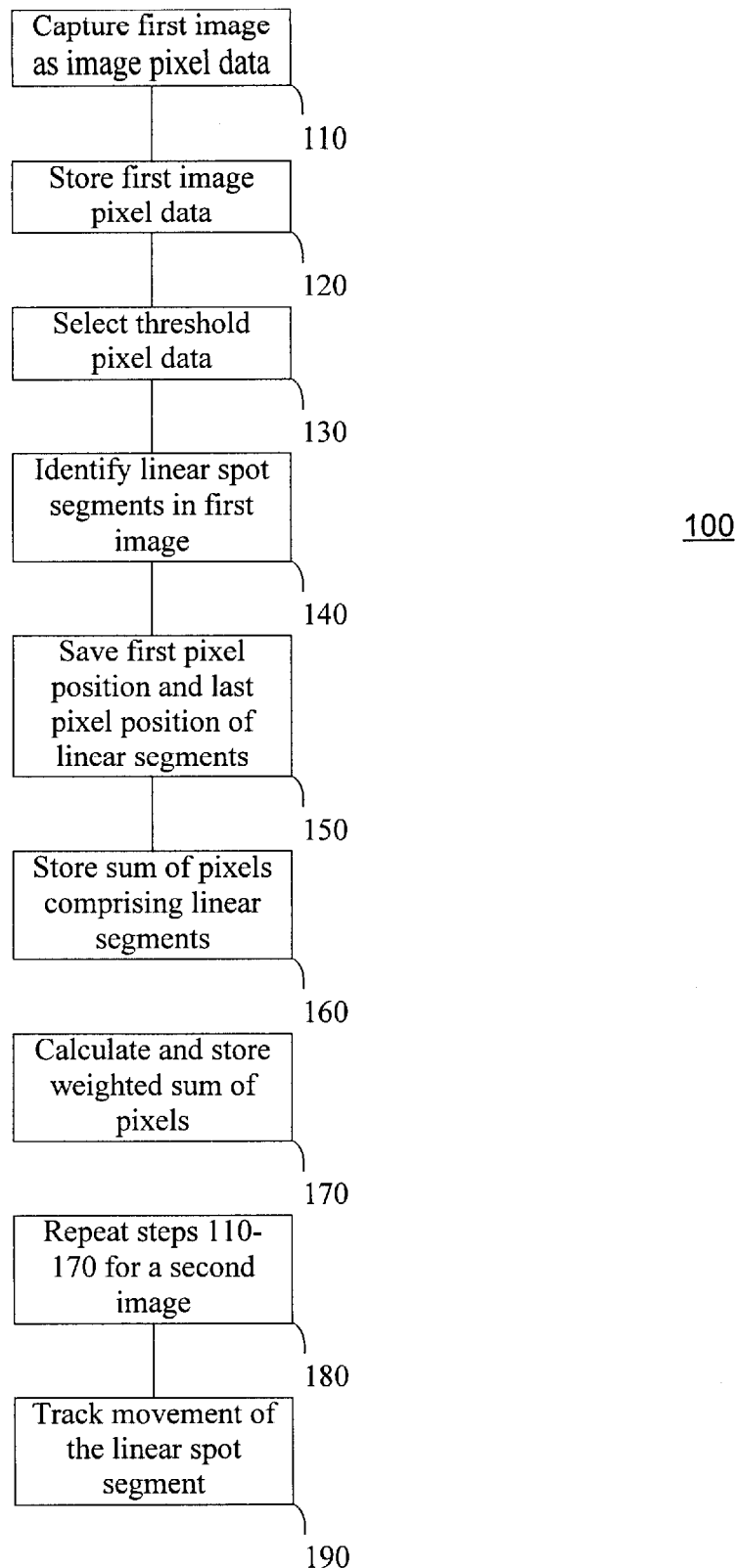
FIG. 1 is a flow diagram depicting a preferred method of the invention.

The method shown in FIG. 1 represents one preferred embodiment of the invention for tracking movements of objects. First, an image is captured as image pixel data (step 110). In step 120, each image pixel datum is stored in an associated memory location having a corresponding address. The data is then thresholded, that is, the pixel data exceeding a threshold is selected from the image pixel data, in step 130. Each pixel having data exceeding the threshold is termed a threshold pixel. In an alternative step, not shown in FIG. 1, image pixel data corresponding to a background image is subtracted from the stored image pixel data.

In step 140, each of the linear spot segments in the image are identified by beginning with the threshold pixels, i.e., those exceeding the threshold. Linear spot segments comprise continuous adjacent threshold pixels. As such, each linear spot segment is formed of a first threshold pixel and a last threshold pixel along with any intermediate threshold pixels and it can be identified by the positions of the first and last pixels alone. Once the first and last pixels are identified, the positions of the first and last pixels are determined from the respective addresses of the memory locations where the first pixel datum and last pixel datum are stored (step 150). These positions correspond to the position (i.e. location) of the first pixel and the last pixel, respectively, in the linear spot segment in the captured image. Consequently, in the present invention, the position of each linear spot segment is identified only by the position of its first and last pixels.

Optionally, a sum of the pixels forming each linear segment is saved for each linear segment (step 160). Further, a weighted sum of the pixels forming each linear segment is calculated and subsequently stored for each linear segment (step 170). The weighted sum of pixels is determined by summing together the respective products of each threshold pixel value and the respective pixel's x-location.

In the embodiment shown in FIG. 1, after the linear spot segments in the first image are all identified and saved, steps 110–170 are repeated for a second image (step 180). Movements of the linear spot segment (and, therefore, the target object) are tracked by comparing the position of the linear spot segment present in the first image with the position of the linear spot segment present in the second image (step 190). For example, the first pixel position and last pixel position of the linear segment present in the first image could be compared with the corresponding first and last pixel position of the linear segment present in the second image. If the addresses are different, then movement (usually velocity: speed and direction) of the linear spot segment is identified. This movement may be used to predict the position of the linear spot segment (spot) in the next sequential captured image. Typically, comparison will be carried out between a spot in a first image and the corresponding spot in the second image because it can be difficult to determine which particular linear spot segment in a second image corresponds to a particular linear spot segment in a first image. One of ordinary skill will recognize that more than one target object can be tracked using this method.

It can be beneficial to provide illumination during capture of the image. Advantageously, the illumination is synchronized to when an image is captured (step 110). Such illumination may be produced, for example, by a laser emitting a beam of coherent energy. In an alternate preferred embodiment, light emitting diodes (LEDs) provide illumination during image capturing (step 110). Timing and exposure of the LEDs are controlled as needed to provide the desired image processing and analysis. Other similar illuminating sources may be used which may or may not be synchronized to the capturing of the image.

In further, alternate embodiments, enhancements in image processing may be realized. In one alternate embodiment, a dynamic region of interest ("ROI") surrounding an object is identified. Only the image pixel data stored in memory having addresses corresponding to an area within the dynamic region of interest are analyzed for selection based on threshold pixel data. Consequently, the remaining pixel data stored in memory not corresponding to an area within the dynamic region of interest is not analyzed. As a result, enhanced processing speed is realized due to the necessity to process only a limited number of pixels. Alternatively, the selection of the ROI can be accomplished before the data is initially stored, thus storing only the data describing pixels in the ROI.

Figure 2:
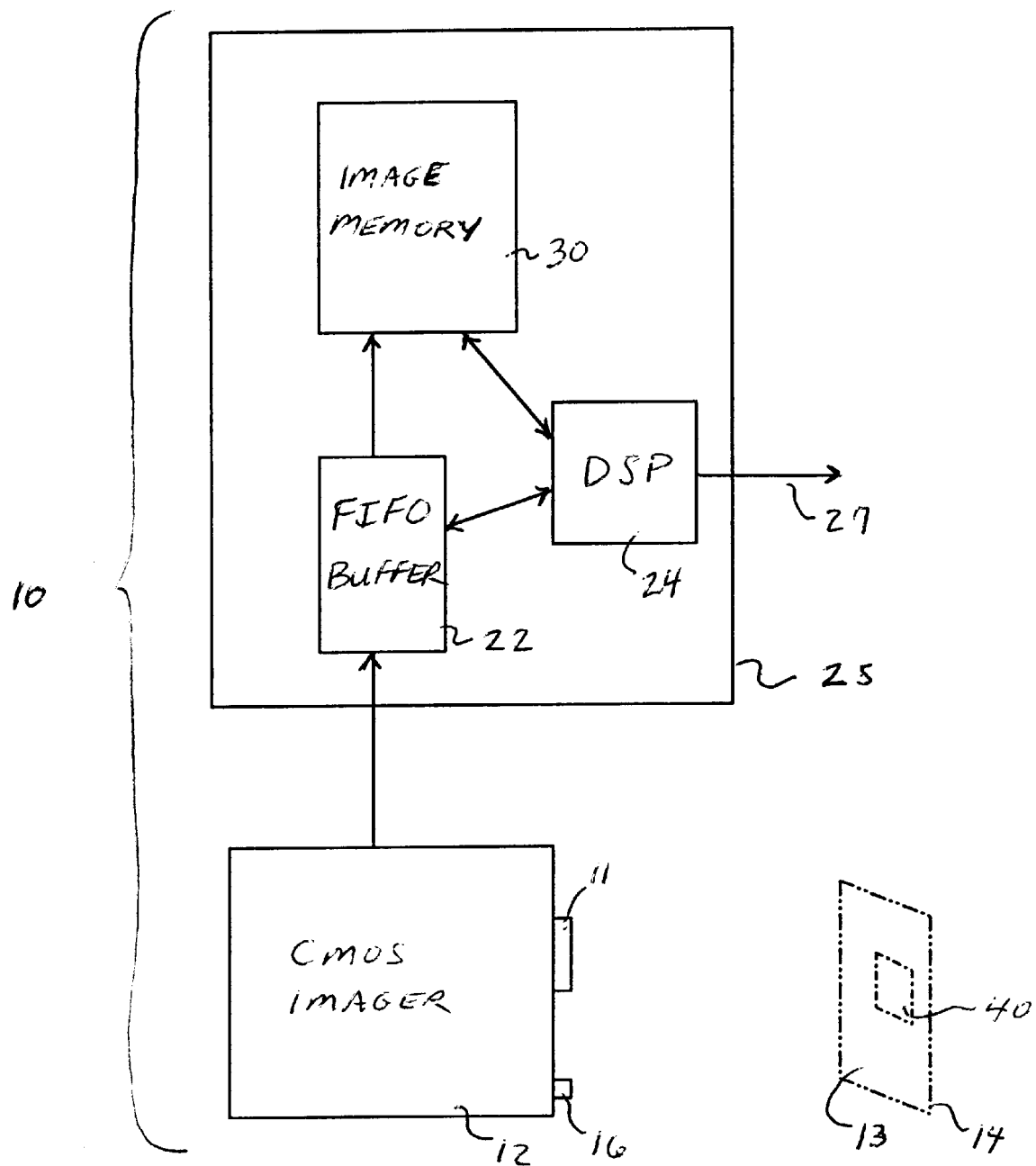
FIG. 2 is a schematic diagram depicting a preferred system of the invention.

Referring now to FIG. 2, image processing system 10 comprises CMOS imager 12. CMOS imager 12 is a digital output camera/imager having lens 11. The CMOS imager 12 processes analog signals within the imager itself and then outputs a digital signal. During operation, CMOS imager 12 captures image 13 within region 14. In this preferred embodiment, a laser 16 illuminates region 14, typically by spreading its beam horizontally and vertically through the region. Advantageously, the firing of a laser 16 is synchronized with the capturing of image 13. Although not depicted, a plurality of lasers may be used to illuminate the region 14.

Analog image 13 is converted to a digital signal as image pixel data 20 which is output to a tracking engine 25 where it is stored in a FIFO (First In, First Out) buffer 22. FIFO buffer 22 accommodates different cameras and imager configurations through simple hardware and software interfaces known to one of ordinary skill in the art. Digital signal processor (DSP) 24 generates pixel memory locations with corresponding addresses in image memory 30, one address for each pixel datum stored in FIFO buffer 22, and then controls the transfer of each pixel datum from FIFO buffer 22 to its respective memory location in image memory 30.

As described with respect to FIG. 1, once the pixel data is stored in the image memory 30, the full image is scanned and thresholded, pixel by pixel, subtracting the background image and selecting threshold pixels. The linear spot segments are identified as a plurality of adjacent threshold pixels. The positions (i.e. locations) of only each first pixel and last pixel present in the captured image linesegment are saved. These positions are identified from the addresses of the respective memory locations where the first threshold pixel datum and the last threshold pixel datum are stored, respectively. Conversely, the positions of any of the intervening threshold pixels are not saved. In a preferred embodiment, the saving of the first pixel position and the last pixel position for each linear spot segment occurs at nearly seven million pixels per second.

Because of a Gaussian distribution of spot pixel intensities from laser reflection and LEDs at a distance, a threshold edge detection algorithm using 1 to 3 threshold levels can be utilized to provide edge detection while providing non-destructive pixel image processing. This type of algorithm has proven as reliable as the slower and more complex Sobel edge detection algorithm in the prior art.

Advantageously, the linear spot segments and data regarding an aggregate spot are used by the DSP to calculate certain characteristics of the spot, such as box centroids, spot centroids, spot edge outlines and object movements. These characteristics are calculated using prior art algorithms and, in this embodiment, they are output from the DSP at 27. Structured lighting illumination can enhance edge outlines and weighted moments of the image which allow size, shape, distance and tilt of the various segments of an object to be tracked.

Figure 3:
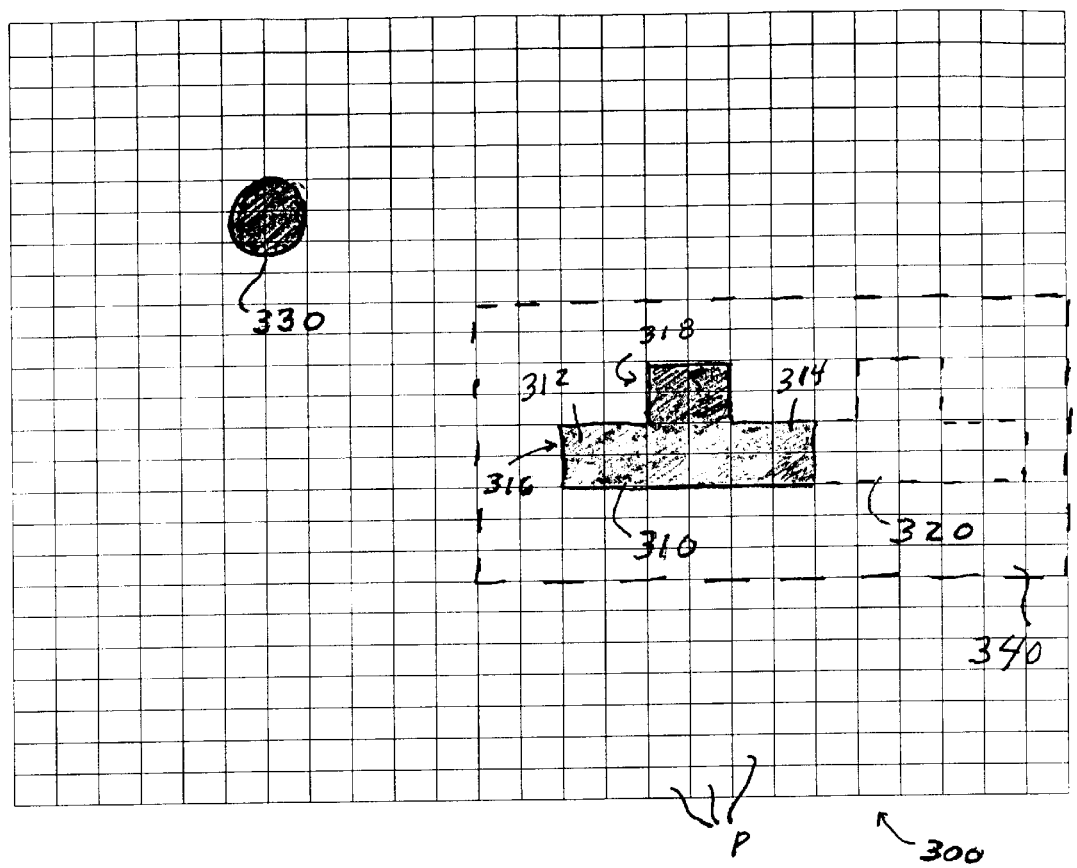
FIG. 3 shows a portion of an image as it appears on an imager array in a preferred embodiment of the invention.

FIG. 3 shows a portion of an image 300 as it may appear on the imaging device or camera inside imager 12 of the invention. It is important to realize that this figure is for illustration purposes only and that, in reality, the resolution of the image pixels is much finer, i.e., there typically millions of pixels in the image. In the image are two spots representing objects, spot 310, which represents, for example, a car and spot 330, which represents, for example, the sun. The figure also shows a spot 320 which represents spot 310 in a later image, indicating that the object has moved. The image is composed of rows and columns with each box representing a pixel P. As is preferable, in this figure, the spots are in high contrast to the background. Thus, the threshold can be set very high so that extraneous noise is filtered out before the pixel data is processed.

As set forth herein, it may also be advantageous to filter out background information. This is useful, for example, if it is desired to look at the motion of the car. It is best not to worry about the sun, represented by spot 330. Spot 330 can easily be filtered out based on previous image captures since the sun will not move much between captures at the rate sufficient to track movement of the car.

Region of Interest (ROI) 340 is shown in outline in FIG. 3. This region of interest 340 is the region surrounding the spot representing the car 310 and can be determined either by a manual method, such as by the user of the system, or automatically, such as with reference to previous image captures.

In the third row of spot 310, it can be determined that a pixel 312 and a pixel 314 are the first and last pixels in a linear spot segment 316. According to a preferred embodiment of the present invention, only those pixel positions are saved. However, in the first row of spot 310, it is noted that there are only two pixels in a linear spot segment 318 and, accordingly, these are considered the first and last spots in linear spot segment 318.

When compared to the prior art VGS, the threshold edge detection algorithm of the present invention provides faster edge tracking and detection. As described above in the summary, image processing speed may be enhanced further by capturing and processing only a small dynamic region of interest (ROI) 40 surrounding an object. As such, the CMOS imager may capture the entire region 14 yet the DSP 24 may only process (e.g., threshold selection, linear spot segment identification and first and last pixel address storage) pixels within the dynamic region 40. Alternatively, CMOS imager 12 may capture only a portion of region 14 such as dynamic region 40. By capturing only a subset of region 14, DSP 24 only needs to process a smaller number of pixels comprising an image inside ROI 40. FIFO buffer 22 is especially useful if a RIO feature is utilized. FIFO buffer 22 receives and temporarily stores data from successive images from imager 12. Although the processing by the DSP 24 is likely slow at first, when image data from the entire image must be processed, it speeds up considerably as the ROI is narrowed. At that point, in a preferred embodiment, the amount of image data in the FIFO buffer 22 remains fairly constant and the DSP 24 is processing the data in essentially real time.

The present invention utilizes a standard, general purpose digital signal processor (DSP) 24 to control the imager/camera and to store the pixel data in the image memory 30. Accordingly, the present invention provides a video image tracking engine which is smaller, simpler, cheaper and more efficient for video image capturing and image processing for object tracking than previously available using a conventional image capturing and processing system.

The method of the present invention also provides a simple image compression algorithm. Compression is achieved by storing only the positions of first and last pixels in each linear spot segment, rather than each pixel in the image. The original image can be reconstructed from the stored first pixel position and last pixel position.

The present method is adaptable for numerous applications, including medical and sports applications such as tracking joint travel and body motion for diagnostics and rehabilitation. In addition, the present method has automotive and vehicular applications such as tracking other vehicles as well as markers in real-time traffic. Further, the present method could be used to track aircraft in take-off, landing or in flight or to detect and track intruders in security applications. Applications of the present invention in space, such as spacecraft station-keeping, circumnavigation, and docking for spacecraft servicing and refueling are also possible.

Although the present invention has been described herein with respect to certain preferred embodiments, the descriptions herein should be considered exemplary and not limiting as various alternatives are possible and contemplated. The scope of the invention should be limited only by the claims.

We claim:

1. A method for processing an image containing an object, comprising:
   a. capturing an image as an array of image pixel data, wherein said array is comprised of a plurality of columns and rows whereby each image pixel has an associated x-coordinate and y-coordinate;
   b. generating a respective memory address for each image pixel datum in said array of image pixel data and maintaining information in association with each said memory address identifying the position within said image of its respective image pixel datum;
   c. storing each image pixel datum in its respective memory address;
   d. comparing each image pixel datum to a threshold to identify linear spot segments wherein the pixel data from two or more pixels located in adjacent columns in the image exceed said threshold, said linear spot segments representing a portion of said object; and
   e. identifying and storing the respective x-coordinates and y-coordinates associated with only the first pixel and the last pixel in each linear spot segment in said image pixel data from the respective memory address.

2. The method as in claim 1, further comprising identifying a spot in said image based upon linear spot segments in adjacent rows of said image, wherein said spot represents said object.

3. The method as in claim 2, further comprising determining a characteristic of said spot based upon information from said linear spot segments in adjacent rows of said image.

4. The method as in claim 3, wherein said determined characteristic is one of two dimensional shape, size, box centroid, or spot centroid.

5. The method of claim 1, further comprising identifying a region of interest within the image to be processed.

6. The method of claim 5, further comprising comparing to the threshold only those pixel data associated with pixels positioned within the region of interest to identify linear spot segments and carrying out steps c-e only for those pixel data.

7. The method of claim 5, wherein said region of interest is identified based upon a manual action by the user of the system.

8. The method of claim 5, further comprising automatically identifying said region of interest based upon information obtained by previously capturing and processing an image.

9. The method of claim 5, further comprising generating a respective memory address only for those image pixel data associated with pixels positioned within said region of interest and carrying out steps c-e for only those pixel data.

10. The method of claim 1 further comprising, before step d, comparing each image pixel datum to known pixel datum representing a background pixel and, if such data are substantially similar, removing such image pixel data from further processing.

11. The method of claim 9, wherein said pixel datum representing a background pixel is determined based upon information obtained by previously capturing and processing an image.

12. The method of claim 1, further comprising:
   storing a respective sum of pixels associated with each linear spot segment.

13. The method of claim 1, further comprising:
   storing a respective weighted sum of pixels associated with each linear spot segment.

14. The method of claim 1, further comprising illuminating said object during the capturing of said image.

15. A method for determining movement characteristics of an object in an image comprising:
   a. capturing a first image as an array of image pixel data, wherein said array is comprised of a plurality of columns and rows whereby each image pixel has an associated x-coordinate and y-coordinate;
   b. generating a respective memory address for each image pixel datum in said array of image pixel data and maintaining information in association with each said memory address identifying the position within said first image of its respective image pixel datum;
   c. storing each image pixel datum in its respective memory address;
   d. comparing each image pixel datum to a threshold to identify linear spot segments wherein the pixel data from two or more pixels located in adjacent columns in the image exceed said threshold, said linear spot segments representing a portion of said object;
   e. identifying and storing the respective x-coordinates and y-coordinates associated with only the first pixel and the last pixel in each linear spot segment in said image pixel data from the respective memory address;
   f. capturing a second image as an array of image pixel data and repeating steps a through e with said image pixel data; and
   g. comparing the x-coordinate and y-coordinate associated with the first pixel and the x-coordinate and y-coordinate associated with the last pixel from said first image with that of said second image and determining movement characteristics of said linear spot segment therefrom.

16. A system for processing an image containing an object, comprising:
   an imager for capturing an image as an array of image pixel data, wherein said array is comprised of a plurality of columns and rows whereby each image pixel has an associated x-coordinate and y-coordinate;
   an image memory; and
   a Digital Signal Processor (DSP) programmed for:
      (a) generating a respective memory address in said image memory for each image pixel datum in said array of image pixel data;
      (b) storing information in said image memory associated with each said memory address identifying the position within said first image of its respective image pixel datum;
      (c) comparing each image pixel datum to a threshold to identify linear spot segments wherein the pixel data from two or more pixels located in adjacent columns in the image exceed said threshold, said linear spot segments representing a portion of said object;
      (d) identifying and storing the respective x-coordinates and y-coordinates associated with only the first pixel and the last pixel in each linear spot segment in said image pixel data from the respective memory address; and
      (e) identifying a spot in said image based upon linear spot segments in adjacent rows of said image.

17. The system of claim 16, further comprising a light source, wherein said DSP is further programmed to control said light source to illuminate said object when said imager captures said image.

18. The system of claim 16, wherein said DSP is further programmed to determine a characteristic of said spot based upon information from said linear spot segments in adjacent rows of said image.

19. The system of claim 16, wherein said DSP is programmed to determine one of the following characteristics: shape, size, box centroid, or spot centroid.

20. The system of claim 16, wherein said DSP is further programmed to determine a region of interest within the image to be processed.

21. The system of claim 16, wherein said DSP is further programmed to compare to the threshold only those pixel data associated with pixels positioned within the region of interest in order to identify linear spot segments and to carry out steps c-e only for those pixel data.

22. The system of claim 16, wherein said DSP is further programmed to, before step d, compare each image pixel datum to known pixel datum representing a background pixel and, if such data are substantially similar, to discontinue further processing of said image pixel datum.

23. The system of claim 16, wherein said DSP is further programmed for storing a respective sum of pixels associated with linear spot segment.

24. The system of claim 16, wherein said DSP is further programmed for calculating a weighted sum of pixels associated with each linear segment and storing the weighted sum of pixels.

25. A system for determining movement characteristics of an object in an image comprising:

an imager for capturing an image as an array of image pixel data, wherein said array is comprised of a plurality of columns and rows whereby each image pixel has an associated x-coordinate and y-coordinate;

an image memory; and a Digital Signal Processor (DSP) programmed for:

capturing a first image as an array of image pixel data, wherein said array is comprised of a plurality of columns and rows;

generating a respective memory address for each image pixel datum in said array of image pixel data and storing information in association with each said memory address sufficient to identify the position within said first image of its respective image pixel datum;

storing each image pixel datum in its respective memory address;

comparing each image pixel datum to a threshold to identify linear spot segments wherein the pixel data from two or more pixels located in adjacent columns in the image exceed said threshold;

identifying and storing the respective x-coordinates and y-coordinates associated with only the first pixel and the last pixel in each linear spot segment in said image pixel data from the respective memory address;

capturing a second image as an array of image pixel data and repeating steps a through e with said image pixel data; and comparing the first and last pixel data from said first image with that of said second image and determining movement characteristics of said linear spot segment therefrom.

* * * * *